United States Patent [19]
Kapp et al.

[11] Patent Number: 5,233,547
[45] Date of Patent: Aug. 3, 1993

[54] ELECTRONIC CHECKING ACCOUNT APPARATUS AND METHOD HAVING A DIGITIZER TO RECEIVE INFORMATION AS A CHECK IS BEING WRITTEN

[75] Inventors: Michael A. Kapp, New Philadelphia; Stephen J. Ames, New Concord, both of Ohio

[73] Assignee: NCR Corporation, Dayton, Ohio

[21] Appl. No.: 790,040

[22] Filed: Nov. 12, 1991

[51] Int. Cl.⁵ ................. G06F 13/00; G06F 15/30
[52] U.S. Cl. ................. 364/705.02; 364/709.11; 235/380
[58] Field of Search .......... 235/379, 380; 382/7, 382/13; 364/401, 406, 408, 705.02, 709.01, 709.02, 709.04, 709.10, 709.11, 709.12, 709.13

[56] References Cited

U.S. PATENT DOCUMENTS

| | | | |
|---|---|---|---|
| 3,920,979 | 11/1975 | Kilby | 235/168 |
| 4,222,109 | 9/1980 | Siwula | 364/705.02 |
| 4,277,837 | 7/1981 | Stuckert | 364/900 |
| 4,308,588 | 12/1981 | Siwula | 364/705.02 |
| 4,358,671 | 11/1982 | Case | 235/379 |
| 4,495,644 | 1/1985 | Parks et al. | 382/13 X |
| 4,587,409 | 5/1986 | Nishimura et al. | 235/380 |
| 4,623,965 | 11/1986 | Wing | 364/408 |
| 4,837,422 | 6/1989 | Dethloff et al. | 235/380 |
| 4,910,696 | 3/1990 | Grossman et al. | 364/705.02 |
| 4,912,640 | 3/1990 | Tsugei | 364/400 |
| 5,008,854 | 4/1991 | Meada et al. | 364/900 |
| 5,015,830 | 5/1991 | Masuzawa et al. | 235/441 |
| 5,093,787 | 3/1992 | Simmons | 364/705.02 X |
| 5,179,502 | 1/1993 | Matsuda | 364/705.03 X |

FOREIGN PATENT DOCUMENTS 3113105 10/1982 Fed. Rep. of Germany.

OTHER PUBLICATIONS

*Computer*, vol. 17, No. 4, Apr. 1984, p. 85.

*Primary Examiner*—Edward P. Westin
*Assistant Examiner*—John R. Lee
*Attorney, Agent, or Firm*—Jr. Sessler

[57] ABSTRACT

An electronic checkbook and method for using it. The checkbook comprises upper and lower parts which fold together when not in use. The lower part receives on its upper surface a booklet of checks. A digitizer is hingedly connected or fixed to the remainder of the lower part and operates as a keyboard in one mode when placed above the check booklet, and can be placed beneath the top check of the booklet and used in a second mode as a means for inputting signals to the remainder of the device representing information written on the check. The lower part of the checkbook also includes other elements of the device including a microprocessor, a power supply and a smart card reader/writer. The upper part includes a display screen upon which checking account information appears during use of the electronic checkbook. The method of use of the checkbook provides maintenance of a record of transactions in the account, including addition of deposits and subtraction of checks drawn on the account.

54 Claims, 6 Drawing Sheets

ELECTRONIC CHECKING ACCOUNT APPARATUS AND METHOD HAVING A DIGITIZER TO RECEIVE INFORMATION AS A CHECK IS BEING WRITTEN

BACKGROUND OF THE INVENTION

This invention relates to an electronic checking account apparatus and method, and more particularly relates to such an apparatus and method in which a digitizer is employed to sense information written on a check as it is written, said information being decoded for use in calculation and display of checking account information.

For many years, checking accounts have been used by many individuals and companies in managing their financial affairs and in making payments for the goods and services which they purchase. Despite the growth of credit cards, debit cards, automatic account debits and other special arrangements, it appears that checking accounts will continue to play a major role in financial transactions in the United States and other countries for many years to come.

Two types of difficulties are commonly experienced in connection with the use of checking accounts, particularly in the case of individual consumers. One such difficulty involves the maintenance of a check register in connection with the account, namely the correct entry of check information into the register, and the addition and subtraction of check entries, interest, deposits, charges, etc., in the check register. The second common difficulty involves the reconciliation process, in which the bank records are reconciled with the customer account.

Accordingly, an apparatus and method which would simplify the check writing process by eliminating the extra manual step of writing the payee, amount and other information on a check register, and by performing the necessary additions and subtractions to maintain the check register in a current, correct condition, would be most helpful to checking account holders.

SUMMARY OF THE INVENTION

The present invention provides a simplification of the check writing and recording process, and utilizes a pressure sensitive digitizer to capture, at a minimum, the payee and amount information during the writing of a check. The invention converts this information to a desired code, such as ASCII, for storage on an electronic check register, which may be stored in on-board memory, on a smart card or other portable IC/memory card. Utilizing a display screen built into the apparatus of the present invention, which may be considered to be an electronic checkbook, the writer of the check may verify that the data was captured and converted to ASCII characters correctly, and may also scroll through the electronic checkbook register. The checking account record may be stored in a smart card which may be inserted into and removed from the apparatus. When sufficient checking account data has been stored in the smart card that its memory capacity has been reached, the smart card may be removed and archived for long term storage. A new electronic register (i.e. smart card) can be purchased from a vendor such as a bank and inserted into the apparatus for continued usage of the apparatus.

The electronic checkbook may also be utilized at locations of point of sale (POS) terminals or automated teller machines (ATM) that provide direct debit capability, assuming that a means of communication is established between the electronic checkbook and the electronic funds transfer (EFT) device. This communication may be by use of the smart card or may be by radio frequency communication. In the case of the smart card, the user would remove the smart card from the electronic checkbook and insert it into the POS or ATM machine having EFT capability, which would, in turn, update the checkbook register for the electronic debit (date, payee, amount). In such an application, the smart card would also serve as the user's debit card, with account number and other appropriate data.

An automatic reconciliation of the user's electronic checkbook register with the bank's record of the account may be performed via communication with the bank's computer. One way would be to insert the smart card from the user's electronic checkbook into an ATM for a reconciliation printout at the ATM. Another method would be to communicate with the bank via a phone line and a communications port on the electronic checkbook. This could be done directly or via a home personal computer. The reconciliation can be printed out on a home computer printer or mailed to the user from the bank.

The invention may also incorporate a time of day/date clock chip for automatically providing the date for electronic check register entries as well as using the device as an electronic calendar/appointment manager. The time of day/date clock may be used in conjunction with an alarm to indicate appointments or regular check payments that are due (e.g., mortgage payment). Additional functionality may be included in the product configuration, such as a basic calculator function.

In accordance with one aspect of the invention, an electronic checking account apparatus comprises a base; a check booklet associated with said base; and a digitizer attached to said base and adapted to be placed in an operative relation to a check when the check is being written to receive information as the check is written.

In accordance with another aspect of the invention, an electronic checking account apparatus comprises a microprocessor for controlling the functioning and operation of the checking account apparatus; memory means coupled to said microprocessor and including checking account information and program means for converting handwritten information into digital information for use by the microprocessor; a display screen coupled to said microprocessor for displaying information related to a checking account; and a digitizer coupled to said microprocessor and adapted to be placed in operative relation to a check when the check is being written to receive information as it is written and to transmit it to said microprocessor.

In accordance with another aspect of the invention, a method for maintaining a checking account register, using a device which includes a data processor, a digitizer, a memory and a check booklet, comprises the following steps: (a) activating said device; (b) placing the digitizer beneath a check from the booklet; (c) writing appropriate information on the check, sensing said written information by the digitizer and decoding said sensed information; and (d) storing the decoded handwritten information in the memory.

In accordance with another aspect of the invention, a method for preparing checks and updating a checking account register, using a checking account device which includes a data processor, a display screen, a digitizer, a memory and a check booklet, comprises the following steps: (a) activating a check register mode of operation of said device; (b) displaying a check register on the display screen; (c) placing the digitizer beneath a check from the booklet; (d) writing appropriate information on the check, sensing said written information by the digitizer and decoding said sensed information; (e) storing the decoded handwritten information in memory; (f) updating the check register information; and (g) displaying the updated information on the display screen.

It is accordingly an object of the present invention to provide a novel electronic checking account apparatus and method.

Another object is to provide an electronic checking account apparatus comprising a base, a check booklet on the base, and a digitizer associated with the base and positionable beneath a check from the booklet.

Another object of the invention is to provide an electronic checking account apparatus in which information written on a check is simultaneously sensed by a digitizer and is used to update a check register and operate a display screen.

Another object of the invention is to provide a method for automatically updating a checking account register when a check is written.

Another object of the invention is to provide a method for preparing checks and updating a checking account register, using a checking account device which includes a display screen, a digitizer, a data processor, a memory and a check booklet.

With these and other objects, which will become apparent from the following description, in view, the invention includes certain novel features of construction and combinations of parts, a preferred form or embodiment of which is hereinafter described with reference to the drawings which accompany and form a part of this specification.

DETAILED DESCRIPTION

Figure 1:
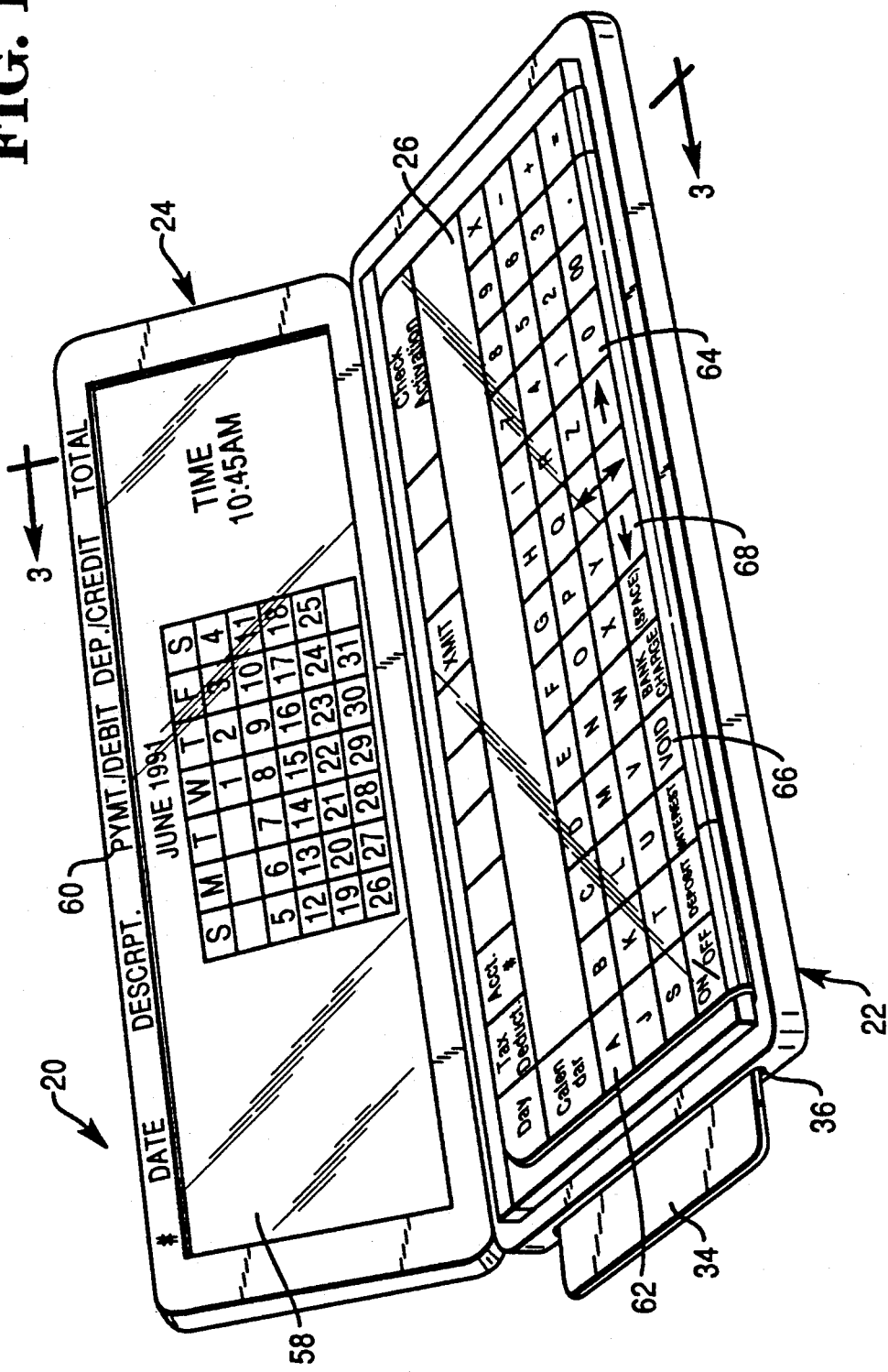
FIG. 1 is a perspective view of the electronic checkbook of the present invention, showing a calendar and a time of day clock on the display screen and showing the digitizer positioned for use in a keyboard mode.
Figure 2:
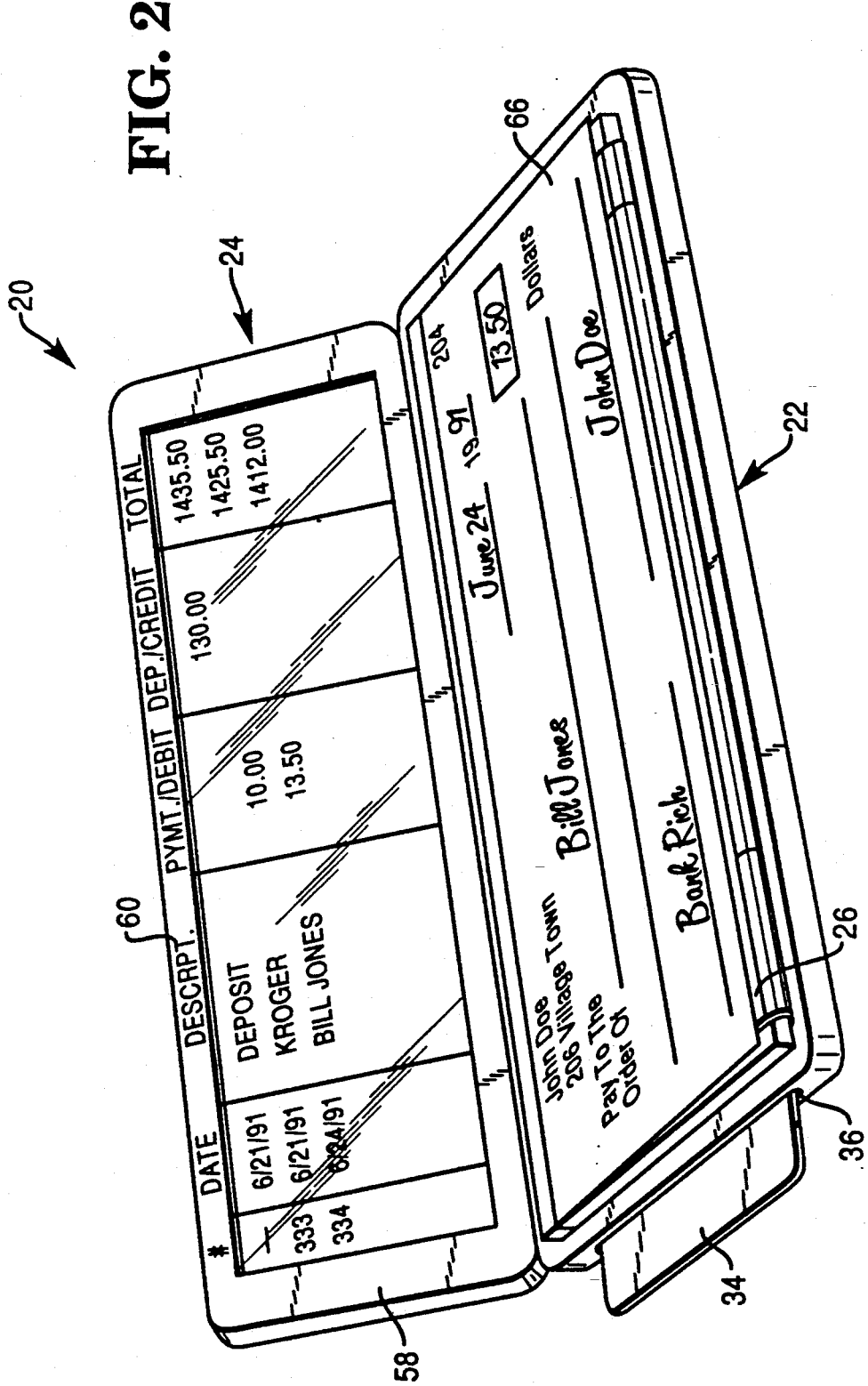
FIG. 2 is a view similar to FIG. 1, except that a check register is shown on the display screen, and the digitizer has been placed beneath the top check of a booklet of checks, so that data written on the check will be sensed by the digitizer for use in the electronic checkbook.
Figure 3:
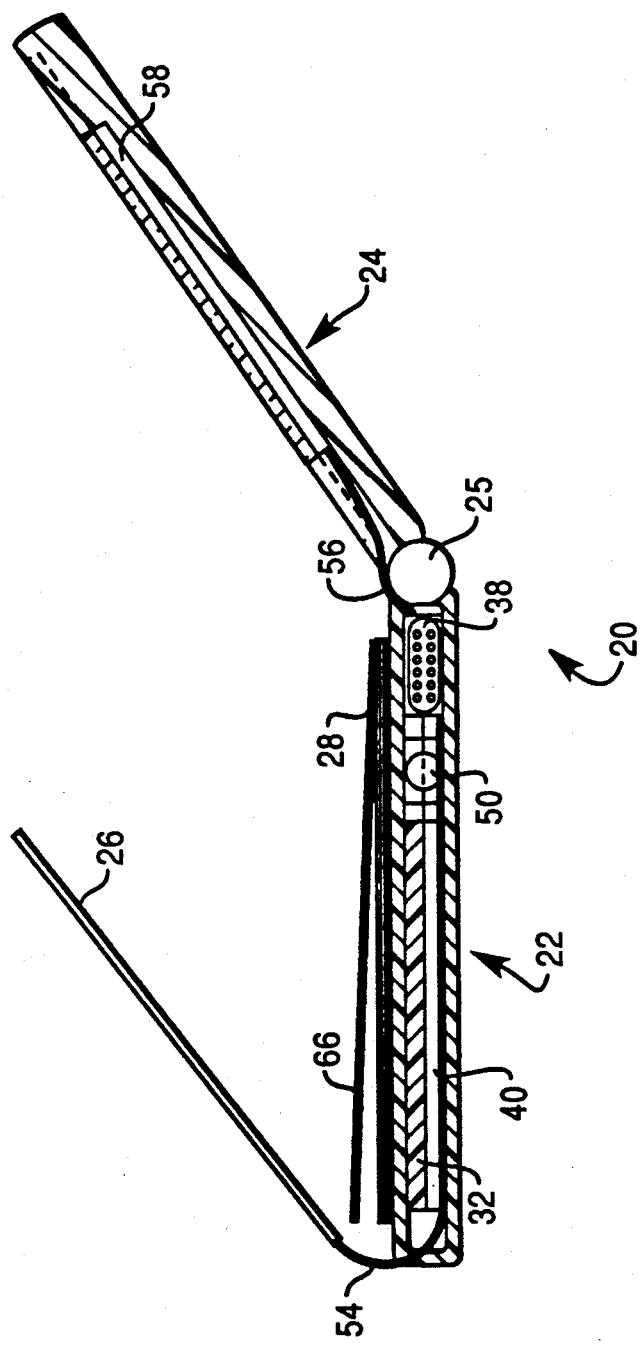
FIG. 3 is a sectional view of the electronic checkbook, taken along line 3—3 of FIG. 1, with the digitizer being lifted away from the lower part of the electronic checkbook to improve the clarity of the showing.
Figure 4:
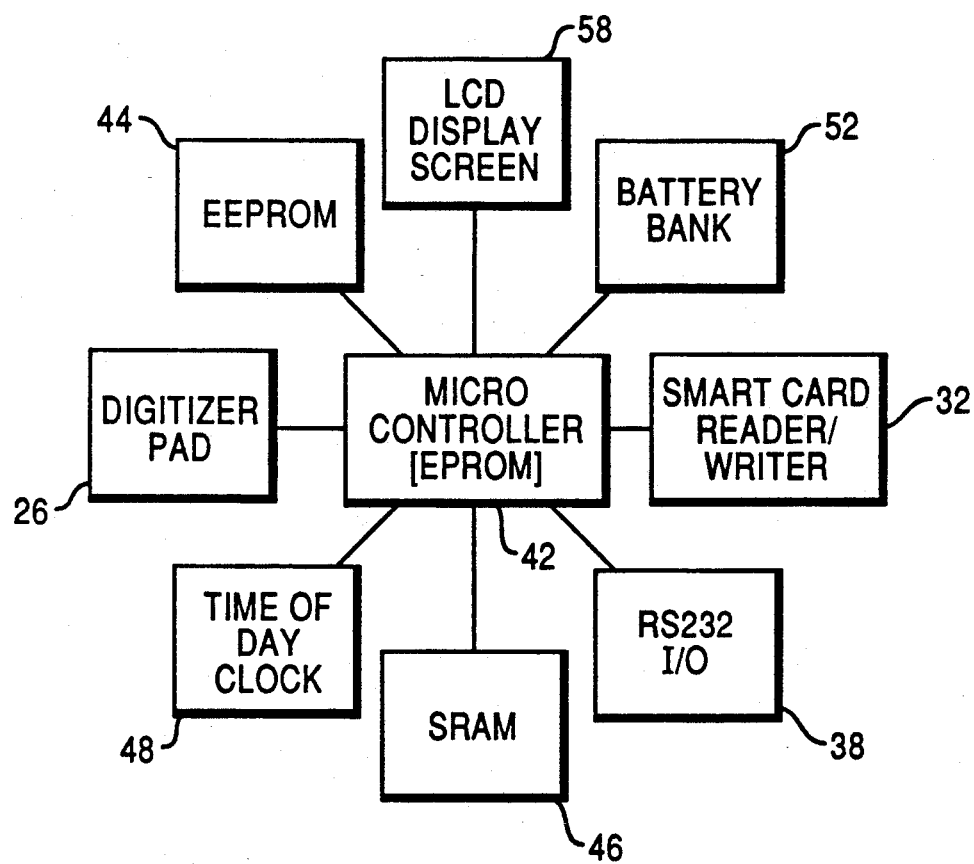
FIG. 4 is a block diagram showing the various elements of the electronic checkbook.

Referring now to FIGS. 1-3 inclusive, shown there is a checking account apparatus or electronic checkbook 20, comprising a base or lower part 22 connected by hinges 25 to a cover or upper part 24. The electronic checkbook 20 is designed to resemble an existing checkbook featuring upper and lower casings or parts. The electronic checkbook has the ability to open and close much like a conventional checkbook. As shown best in FIG. 3, included in the lower part are a digitizer or digitizer pad 26; a booklet of checks 28 positioned on the upper surface 30 of the lower part 22; a smart card reader/writer 32 for reading a smart card 34 which can be inserted into a slot 36 in the lower part 22; a buss connector 38 which may be of the RS232 type for connecting the checkbook 20 to other electronic apparatus; a printed circuit board 40 on which is included a microprocessor or microcontroller 42 (FIG. 4), an EEPROM memory 44, an SRAM memory 46 and a time of day clock 48; a battery compartment 50 containing a bank of batteries 52; a ribbon cable 54 connecting the digitizer 26 to the printed circuit board 40; and a ribbon cable 56 connecting the printed circuit board 40 to a liquid crystal display screen 58 which is mounted in the upper part 24 of the electronic checkbook 20. FIG. 4 is a block diagram which shows the interconnection of the various elements described above. The digitizer 26 may be hingedly connected to the lower part 22 as shown in FIGS. 1, 2 and 3, or may be fixed to the upper surface of the lower part, if desired. If the digitizer 26 is fixed to the upper surface of the lower part 22, the check booklet 28 may be loose within the upper and lower parts 24 and 22 or may be connected in some appropriate manner to the electronic checkbook 20.

The manner in which the various components of the system cooperate in the overall organization is summarized below. Power for the system is provided by the batteries 52 which may comprise a bank of long-life lithium batteries. The heart of the system is the microprocessor or microcontroller 42. All peripheral hardware devices are controlled by the microcontroller via a program stored in its resident read only memory (ROM). Soft program features, that is, those which the user has control over, are stored in a non-volatile memory such as the electrically erasable programmable read-only memory EEPROM 44.

Other forms of memory are required to support functions outside the resident ROM. A "scratch pad" memory in the form of the static random access memory SRAM 46 supports algorithms for handwriting conversion to ASCII format, for example. Such handwriting conversion algorithms are well-known.

A second form of memory external to the ROM is the smart card 34 with its associated reader/writer 32. The smart card memory device is used in the present invention to hold financial account data only. The protected data stored in the smart card 34 is meant to be detachable for long term storage. It is also possible for a user to reuse the smart card by dumping its contents into another storage medium.

The liquid crystal display screen 58 is a system element which will display data associated with any screen function. For example, in the check register mode of operation, as shown in FIG. 2, the liquid crystal display screen will be formatted to reveal financial data such as check number, date, amount, payee, etc., that exists in the memory of the smart card 34. It will be noted that a frame on the upper part 24 of the electronic checkbook 20 may be provided with legends 60 which identify the information appearing in the various columns shown on the display screen 58. The financial data can be manipulated on the display 58 screen by the user and can also be edited.

Also essential to the human/display interface is the digitizer 26. The digitizer is a pressure-sensitive plastic pad which transmits geometrically mapped pressure induced signals to the microcontroller 42. In the present invention, the digitizer 26 is used in two different modes.

In a first mode, as shown in FIG. 1, the digitizer is electronically configured as a keyboard input device. In order to facilitate its use in this mode of operation, the digitizer includes marking on its upper surface, by printing, silk-screening or other suitable operation, of a representation of a keyboard. This may include alphabetic key positions 62, numeric key positions 64, function key positions 66 and cursor key positions 68. In this mode of operation of the digitizer, pressure on a portion of the digitizer corresponding to a given key representation causes a signal representing depression of that key to be generated and transmitted to the microprocessor 42 for entry of data and/or control of the system in accordance with the key depressed. For example, one of the locations for a cursor key 68, when pressed, would move a cursor block on the screen 58 to a different location for editing purposes.

In a second mode of operation, the digitizer 26 functions to transmit pressure-induced signals, in the form of X-Y coordinates, from handwriting on a check 66 (FIG. 2) from the check booklet 28 which is placed on of the digitizer 26. These signals are then converted to ASCII characters using handwriting recognition algorithms stored in memory in the electronic checkbook. Conversion of the operation of the digitizer 26 from the first mode of operation to the second mode and vice versa may be accomplished by pressing an appropriate key location on the digitizer, such as the "check activation" key representation shown in the upper right corner of the digitizer as it appears in FIG. 1. It will be noted that this location is below the "date" area of a check 66 in FIG. 2, so that writing of the date on a check 66 when the digitizer 26 is positioned beneath the check automatically causes the digitizer to shift from its first mode of operation to its second mode.

Communications between the electronic checkbook 20 and other peripheral devices, such as personal computers, modems and printers, can be supported via the RS232 hardware 38.

A time of day clock 48 in the form of a chip located on the printed circuit board 40 keeps time and date instruction precisely for other functions. This information is displayed on the display screen 58 when the digitizer 26 is in its first mode of operation. For example, in the calendar mode, the time and a monthly calendar could be constructed from data supplied by the time of day chip. Time and date information could also be used in stamping financial check transactions, alarms or planner dates.

The various components described above are commercially available. Suitable type numbers and vendors for the various components are as follows: microprocessor or microcontroller, type 80C 194, available from Intel; liquid crystal display screen, type DMF6104NB-FW, available from Optrex; batteries, type LR44, available from Panasonic; smart card and reader/writer, type RBC 1001E10, available from Seiko Epson Corp.; RS232 connector, type RS-232A, available from Maxim Integrated Pr.; SRAM, type HM62128, available from Hitachi America Ltd.; time of day clock, type MM58274C, available from National Semiconductor Corporation; digitizer pad, type Brady Touch Analog Resistive Touch Pad, available from W. H. Brady Company; and EEPROM, type NSCNMC93C66, available from National Semiconductor Corporation.

Figure 5A:
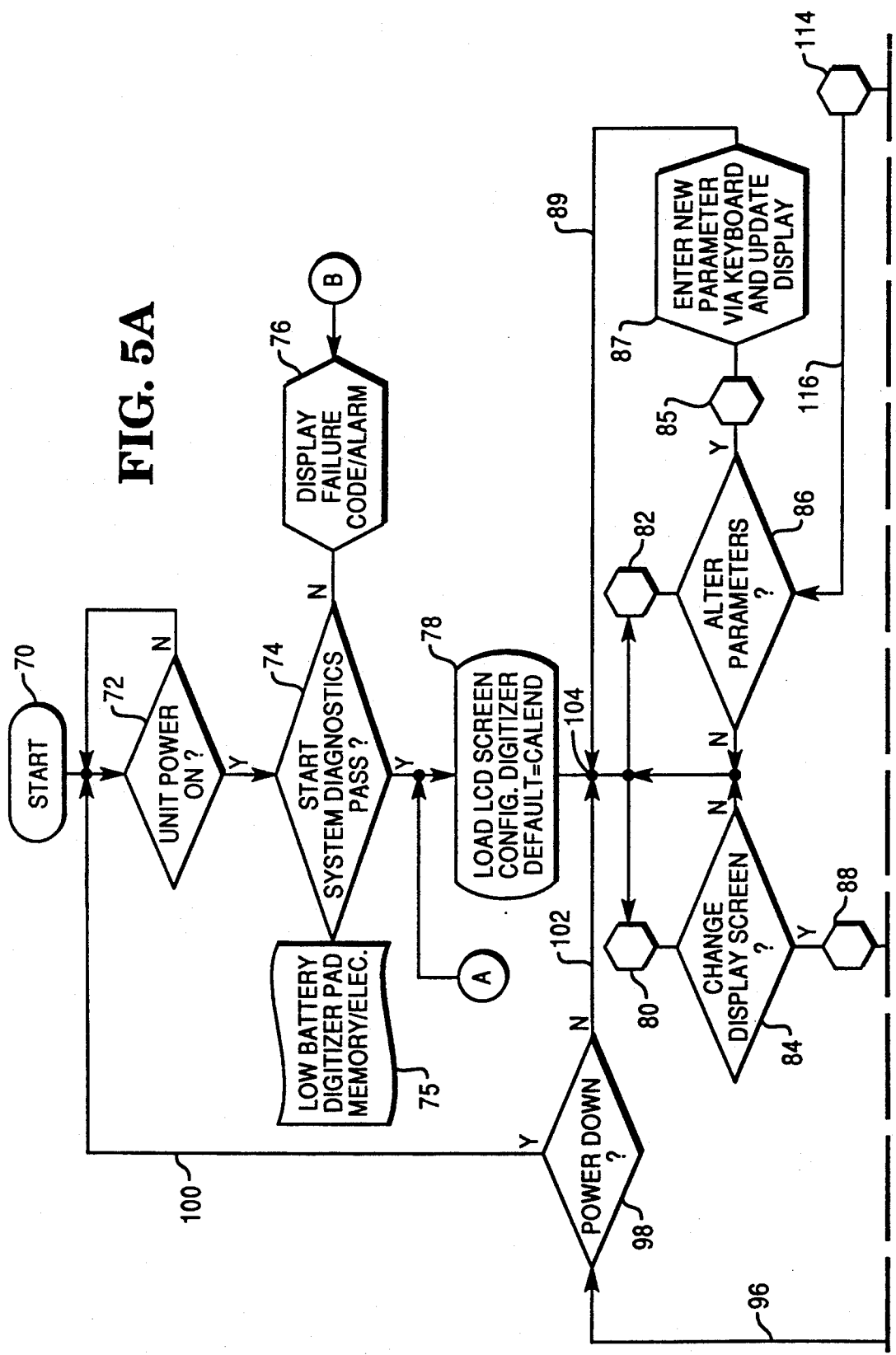
FIGS. 5A and 5B, taken together, constitute a flow diagram of the process for using the electronic checkbook to provide automatic check register updating.
Figure 5B:
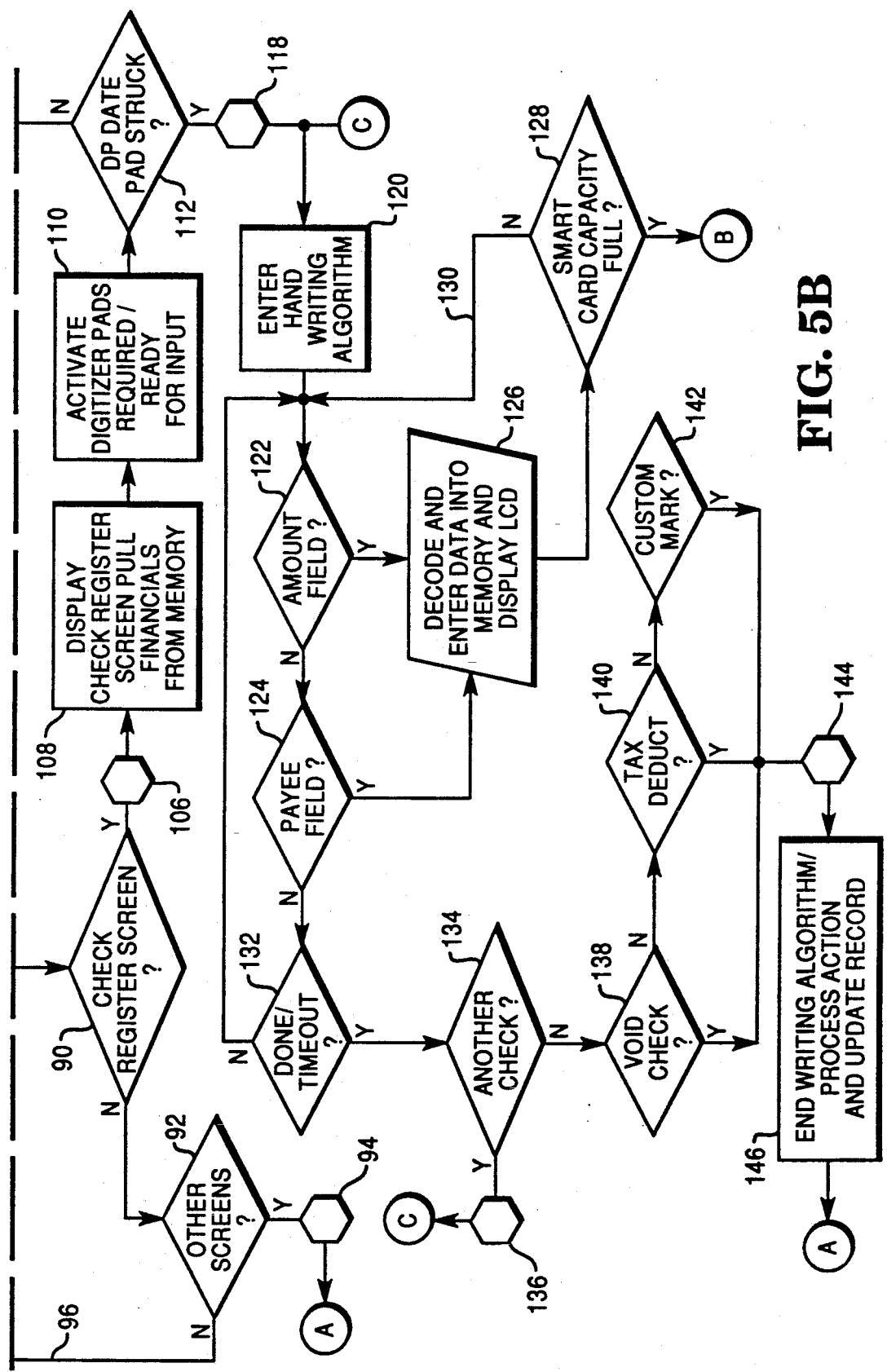

The manner in which the electronic checkbook 20 is operated in check processing transactions will now be described in connection with the flow diagrams of FIGS. 5A and 5B. The process shown therein commences with the "start" block 70. The system is then turned on and the microcontroller 42 is reset. This may be done by separating the upper and lower parts 24 and 22 of the electronic checkbook 20 to actuate a switch, or, if desired, a separate switch can be manually actuated. Once it has been determined that the unit's power is on (block 72), the first order of business, for the program controlling the process, is to check out the proper functioning of the system hardware by suitable diagnostic tests. Hardware elements such as the digitizer 26, the SRAM memory 46, the EEPROM memory 44, the LCD display 58 and other devices, such as those listed in block 75, within the electronics package are tested. If it is determined in decision block 74 that any element has failed a diagnostic test, the process moves to block 76, in which the failed element is identified and displayed to the user on the display 58, if said display is functional, or by some other signal means such as an audible beeping sound. If all of the diagnostic tests are passed, the process moves to block 78.

In block 78, a "default" configuration will appear on the display screen 58 and the digitizer functions which are associated with it will be activated. As an example, let it be assumed that upon successful power-up of the system, the "default" display is a calendar/time display as seen in FIG. 1. The term "default" as used herein refers to the display which is seen on the screen 58 whenever the check record shown in FIG. 2 is not being displayed. As seen in FIG. 1, the digitizer 26 is lying atop the top check 66 of the check booklet 28, and the keyboard layout of the digitizer 26 is thus exposed to view. However only certain ones of the function keys are operative for interacting with the display shown in FIG. 1. Other digitizer keys are active at other times for interacting with other displays which may be presented on the screen 58. Such other displays may, for example, be planners, phone/address, RS232 communications, calculator, alarm clock, note recorder, etc.

Movement of the process from block 78 requires a key stroke, as represented by one of the blocks 80 and 82, to move either to another screen display (block 84) or to activate an allowable key which can alter the parameters of the current screen display (block 86). The term "parameters" refers to user alterable options which affect formats and functions of the display screen 58. An example of a parameter change is an alteration of the date on the calendar display. A parameter change is accomplished by an appropriate key stroke (block 85) which causes a new parameter to be entered on the screen (block 87), after which the process returns to node 104 via path 89.

If decision block 84 is chosen, the display on the screen is changed by operation of a suitable key (block 88). The first screen display choice is the check register screen, as indicated in decision block 90. Alternative screen display choices (block 92) include the above-mentioned displays such as planners, phone/address, RS232 communications, calculator, alarm clock, note recorder, etc. One of these other displays can be chosen by an appropriate key stroke 94, after which the process returns via the circled A symbol to block 78. If no other screen display is chosen, the process continues via path 96 to a power down decision block 98. If power is turned off by closing the check register 20, the process proceeds via path 100 to block 72. If power is not turned off, the process returns via path 102 to a process node 104.

If the check register screen is chosen by a key stroke 106, the process continues to block 108 where the check register display format will appear on the screen 58, and the last ten lines of financial data from a default account will be called up from the memory of the smart card 34 or other memory means and will provide data for inclusion in the check register format. Proceeding to block 110, the digitizer keys germane to that function are activated and readied for input. The user can place the digitizer 26 under the check to be written upon. This can be done by folding the digitizer 26 under the top check 66 of the check booklet 28 in the embodiment of the invention shown in FIGS. 1, 2 and 3 in which the digitizer 26 is hingedly connected to the lower part 22. If the digitizer 26 is fixed to the lower part 22, a check can be removed from the check booklet 28 and placed on top of the digitizer 26. The user will then strike the date pad which lies beneath the check's date area (block 112). Alternatively the user can leave the digitizer 26 on top of the checks and change screen displays by an appropriate key stroke (block 114), after which the process returns via path 116 to the block 86.

If the date pad is struck by writing the check date or by striking an appropriate key (block 118), the digitizer 26 is activated to receive information via the areas under the check payee and amount fields. In addition, the handwriting decoding algorithm is activated (block 120). The user has the freedom of entering either the check amount (block 122) or the payee (block 124) first. In either case, the data from the digitizer 26 is sent to the microcontroller 42 for the handwriting algorithm analysis (block 126). The decoded information is sent to the memory of the smart card 34. A determination is made (block 128) as to whether there is sufficient smart card memory available to hold this transaction. If not, the process proceeds via the circled symbol "B" to the block 76, where a suitable alarm indication is given to alert the user. If sufficient memory remains, the process returns to block 120, via path 130. When the amount and payee fields are complete or timed out (block 132), the user can go on to write another check (block 134) by an appropriate key stroke (block 136), in which case the process returns via circled symbol "C" to block 120. Alternatively, the user can take further action with respect to the check just written. The check can be voided (block 138); the check can be marked as tax deductible (block 140); or the check can be custom marked (block 142). A key can then be pressed (block 144) to end the check writing/marking process (block 146), after which the process returns via circled symbol "A" to block 78.

While the forms of the invention shown and described herein are admirably adapted to fulfill the objects primarily stated, it is to be understood that it is not intended to confine the invention to the form or embodiment disclosed herein, for it is susceptible of embodiment in various other forms within the scope of the appended claims.

What is claimed is:

1. An electronic checking account apparatus, comprising:
    a base;
    a check booklet associated with said base; and
    a digitizer attached to said base and adapted to be placed in operative relation to a check when the check is being written to receive information as the check is written.

2. The apparatus of claim 1, in which the digitizer is hingedly connected to said base.

3. The apparatus of claim 2, in which the check booklet is positioned on an upper surface of said base and in which the hinged connection of the digitizer to the base enables the digitizer to be positioned between a top check of the check booklet and the remainder of the checks.

4. The apparatus of claim 1, also including a cover member hingedly coupled to said base, which cover member may be closed to cover the upper surface of said base.

5. The apparatus of claim 4, in which the cover member includes a display screen.

6. The apparatus of claim 5, in which the display screen is on a lower surface of the cover member, so that it is concealed when the cover member is closed on the base.

7. The apparatus of claim 5, also including decoding means and data processing means for decoding signals produced by said digitizer when the check positioned above it is written upon, said data processing means being coupled to said decoding means and to said display screen to cause information to be displayed on said display screen corresponding to information written on the top check.

8. An electronic checking account apparatus, comprising:
    a microprocessor for controlling the functioning and operation of the checking account apparatus;
    memory means coupled to said microprocessor and including checking account information and program means for converting handwritten information into digital information for use by the microprocessor;
    a display screen coupled to said microprocessor for displaying information related to a checking account; and
    a digitizer coupled to said microprocessor and adapted to be placed in operative relation to a check when the check is being written to receive information as it is written and to transmit it to said microprocessor.

9. The electronic checking account apparatus of claim 8, also including battery means coupled to the microprocessor for powering the apparatus.

10. The electronic checking account apparatus of claim 8, also including a time-of-day clock coupled to the microprocessor for adding time information to the checking account information.

11. The apparatus of claim 10, also including an alarm, and in which the time-of-day clock is used in conjunction with the alarm to indicate preprogrammed check payments that are due.

12. The electronic checking account apparatus of claim 8, also including a smart card detachably coupled to the microprocessor for providing financial account data to the apparatus.

13. The electronic checking account apparatus of claim 8, in which the memory means includes a static random access memory for supporting algorithms for conversion of handwriting information to a digital format.

14. The apparatus of claim 12, in which the digital format of the handwriting information is an ASCII format.

15. The apparatus of claim 8, in which the display screen is a liquid crystal display screen.

16. The apparatus of claim 8, in which the digitizer can be configured as a keyboard entry device.

17. The apparatus of claim 8, also including a hinged two-part housing, with the display screen being located in the upper part of the housing and the digitizer being located in the lower part of the housing.

18. The apparatus of claim 17, also including a smart card reader/writer receptacle and a smart card in the lower part of the housing.

19. The apparatus of claim 17, also including a surface on the lower part for receiving and retaining a booklet of checks and further including a hinged mounting for the digitizer to enable the digitizer to be placed beneath the top check of the booklet and above the remaining checks of the booklet.

20. The apparatus of claim 17, in which the display screen is located on an inner surface of the upper part and the digitizer is located on an inner surface of the lower part, so that both the display screen and the digitizer are concealed when the housing is closed.

21. The apparatus of claim 8, in which the display screen may be controlled by the microprocessor to display a calendar.

22. The apparatus of claim 21, in which the display screen may be controlled by the microprocessor to display the time of day in addition to displaying a calendar.

23. The apparatus of claim 8, in which the display screen may be controlled by the microprocessor to display the time of day.

24. The apparatus of claim 8, also including a buss connection coupled to the microprocessor to enable the apparatus to be coupled to other equipment.

25. An electronic checking account apparatus, comprising:
   a microprocessor for controlling the functioning and operation of the checking account record apparatus;
   memory means coupled to said microprocessor and including checking account information and program means for converting handwritten information into digital information for use by the microprocessor;
   a display screen coupled to said microprocessor for displaying information related to a checking account;
   a digitizer coupled to said microprocessor and adapted to be placed in operative relation to a check when the check is being written to receive information as it is written and to transfer it to said microprocessor;
   a smart card reader/writer coupled to said microprocessor for reading checking account information from and writing checking account information into a smart card inserted therein;
   battery means for providing power for said apparatus and coupled thereto; and
   a housing comprising hinged upper and lower parts which can be moved together for security and separated for use, said upper part holding the display screen, and said lower part holding the microprocessor, the memory means, the digitizer, the smart card reader and the battery means.

26. The apparatus of claim 25, in which the digitizer is hingedly connected to the lower part of the housing, said apparatus also including a booklet of checks positioned on the lower part so that the digitizer can be placed beneath the top check of the booklet.

27. The apparatus of claim 25, also including a time of day clock coupled to the microprocessor and located in the lower part.

28. The apparatus of claim 27, also including an alarm, and in which the time of day clock is used in conjunction with the alarm to indicate preprogrammed check payments that are due.

29. The apparatus of claim 25, in which a handwriting recognition algorithm is included in said memory means.

30. The apparatus of claim 25, in which the memory means comprises an SRAM.

31. The apparatus of claim 25, in which the memory means comprises an EEPROM.

32. The apparatus of claim 25, also including a communications port coupled to said microprocessor and located in said lower part.

33. The apparatus of claim 25, in which said digitizer functions in one mode to receive handwritten information when a check is written, and also functions in a second mode as a keyboard.

34. The apparatus of claim 33, in which the digitizer is printed on an exposed surface with a representation of a keyboard, including a plurality of function keys and a plurality of cursor keys.

35. The apparatus of claim 25, in which indicia is provided on the upper part of the housing adjacent to the display screen for identifying the various elements of check register data provided on the display screen.

36. The apparatus of claim 25, in which the display screen is located on an inner surface of the upper part and the digitizer is located on a facing inner surface of the lower part.

37. A method for maintaining a checking account register, using a device which includes a data processor, a digitizer, a memory and a check booklet, comprising the following steps:
   (a) activating said device;
   (b) placing the digitizer beneath a check from the booklet;
   (c) writing appropriate information on the check, sensing said written information by the digitizer and decoding said sensed information; and
   (d) storing the decoded handwritten information in the memory.

38. The method of claim 37, in which said memory comprises a smart card.

39. The method of claim 37, also including the following steps:
   (h) causing the digitizer to function in a keyboard mode; and
   (i) making non-check entries by operating the digitizer in its keyboard mode.

40. A method for preparing checks and updating a checking account register, using a checking account device which includes a data processor, a display screen, a digitizer, a memory and a check booklet, comprising the following steps:
   (a) activating a check register mode of operation of said device;
   (b) displaying a check register on the display screen;
   (c) placing the digitizer beneath a check from the booklet;

(d) writing appropriate information on the check, sensing said written information by the digitizer and decoding said sensed information;
(e) storing the decoded handwritten information in memory;
(f) updating the check register information; and
(g) displaying the updated information on the display screen.

41. The method of claim 40, in which said memory comprises a smart card.

42. The method of claim 40, also including the following steps:
(h) causing the digitizer to function in a keyboard mode; and
(i) making non-check entries to the check register by operating the digitizer in its keyboard mode.

43. The method of claim 42, also including the following steps:
(j) in the case of an error, positioning a cursor beneath an incorrect character on the check register using a key on the digitizer in its keyboard mode; and
(k) using a key represented on the digitizer to correct the incorrect character.

44. The method of claim 39, in which the writing of certain of said appropriate information on said check causes said digitizer to operate in a mode in which it senses said appropriate information as it is written.

45. The method of claim 44, in which said certain of said appropriate information is the date of the check.

46. A method for preparing checks and updating a checking account register, using a checking account device which includes a display screen, a digitizer, a data processor and a memory, comprising the following steps:
(a) activating said device;
(b) applying diagnostic tests to the device;
(c) applying check register display information to the display screen;
(d) conditioning digitizer keys for operation;
(e) placing a check to be written over the digitizer so that writing impressions made on the check will be sensed by the digitizer;
(f) writing appropriate information on the check, sensing said information by the digitizer and decoding said information sensed by the digitizer;
(g) storing the decoded handwritten information in memory;
(h) updating the check register information; and
(i) displaying the updated information on the display screen.

47. The method of claim 46, in which said memory comprises a smart card.

48. The method of claim 46, also including the following steps:
(j) causing the digitizer to function in a keyboard mode; and
(k) making non-check entries to the check register display.

49. The method of claim 48, also including the following steps:
(l) in the case of an error, positioning a cursor beneath an incorrect character on the check register using a key on the digitizer in its keyboard mode; and
(m) using a key represented on the digitizer to correct the incorrect character.

50. A method for preparing checks and updating a checking account register, using a checking account device which includes a display screen, a digitizer, a data processor, a memory and a check booklet, comprising the following steps:
(a) activating the device for operation;
(b) applying diagnostic tests to the device;
(c) providing visible data on the display screen;
(d) operating a key on the digitizer to change the data on the display screen to a showing of a check register;
(e) placing the digitizer beneath a check from the check booklet;
(f) changing the digitizer mode from a keyboard mode to a data entry mode by entering a date on the check which is positioned above the digitizer;
(g) writing check data including amount and payee;
(h) sensing said written information by the digitizer;
(i) decoding the sensed information;
(j) storing the decoded information in memory and displaying it on the check register display screen together with a new total obtained by subtracting the amount of the check from a previous total;
(k) terminating the check writing operation.

51. The method of claim 50, in which the checking account device also includes a smart card reader/writer and a smart card having a memory, including the following additional steps:
(l) transmitting the stored information from step (j) to the smart card; and
(m) providing an alarm indication when the capacity of the smart card memory is reached.

52. The method of claim 51, in which said alarm indication is audible.

53. The method of claim 51, in which said alarm indication comprises a visible indication on the display screen.

54. The method of claim 51, also including a step of entering the amount of a deposit by use of the digitizer in a keyboard mode, and displaying the deposit and a new total on the check register.

* * * * *

UNITED STATES PATENT AND TRADEMARK OFFICE
CERTIFICATE OF CORRECTION

PATENT NO. : 5,233,547

DATED : August 3, 1993

INVENTOR(S) : Michael A. Kapp et al.

It is certified that error appears in the above-identified patent and that said Letters Patent is hereby corrected as shown below:

On the title page, before Item [57] Abstract:

"Attorney, Agent, or Firm--Jr. Sessler" should be --Attorney, Agent, or Firm--Albert L. Sessler, Jr.--

Signed and Sealed this

Twenty-sixth Day of April, 1994

*Attest:*

BRUCE LEHMAN

*Attesting Officer*     *Commissioner of Patents and Trademarks*